US007717377B1

(12) United States Patent
Corrado

(10) Patent No.: US 7,717,377 B1
(45) Date of Patent: May 18, 2010

(54) COLLAPSIBLE INSTRUMENT STAND

(76) Inventor: Christopher Louis Corrado, 324 Durkee La., East Patchogue, NY (US) 11772

(*) Notice: Subject to any disclaimer, the term of this patent is extended or adjusted under 35 U.S.C. 154(b) by 416 days.

(21) Appl. No.: 11/532,542

(22) Filed: Sep. 18, 2006

(51) Int. Cl.
*F16M 11/00* (2006.01)

(52) U.S. Cl. .................... 248/150; 248/166; 248/125.9; 248/465

(58) Field of Classification Search ................. 248/150, 248/166, 188.6, 460, 463, 464, 465, 125.1, 248/125.8, 125.9
See application file for complete search history.

(56) References Cited

U.S. PATENT DOCUMENTS 3,799,488 A * 3/1974 Sena .......................... 248/452
3,958,786 A * 5/1976 Mann ...................... 248/176.3
4,714,224 A * 12/1987 Calmes ...................... 248/465
5,029,796 A 7/1991 Schoenig
5,098,092 A * 3/1992 Aakre et al. ................ 473/483
5,165,634 A * 11/1992 Garbuzov et al. ........... 248/166
5,170,983 A * 12/1992 Stewart ...................... 248/558
5,505,413 A 4/1996 Hennessey
5,622,344 A 4/1997 Gracie
5,725,192 A * 3/1998 Cloninger .................. 248/458
6,540,182 B1 4/2003 Wilfer
D477,718 S 7/2003 Vail
6,585,315 B1 7/2003 Vail
6,945,597 B1 9/2005 Brown et al.
7,017,871 B2 * 3/2006 Chen .......................... 248/161
2007/0089648 A1 * 4/2007 Harrison et al. ............. 108/115

* cited by examiner

*Primary Examiner*—J. Allen Shriver, II
*Assistant Examiner*—Steven M Marsh

(57) ABSTRACT

A foldable and collapsible instrument stand, for securely holding an instrument, having a first support portion, a second support portion, and an adjustable head. The instrument stand may be placed in either a deployed state or a collapsed state. When in the deployed state, the first support portion is in the substantially upright position, while the second support portion is in the extended position. In contrast, when the instrument stand is in a collapsed state, several portions including the first support portion, the second support portion, and the base are each positioned in a folded and substantially parallel position, enabling an easy transporting of the instrument stand. This abstract is provided to comply with rules requiring an abstract, and is submitted with the intention that it will not be used to interpret or limit the scope and meaning of the claims.

5 Claims, 14 Drawing Sheets

72a'
72
75a
75c
75d
75b
69
74

76
69
72
67
75a
75c
75b
75d

COLLAPSIBLE INSTRUMENT STAND

TECHNICAL FIELD

The present invention relates most generally to musical instrument stands. More particularly, the invention relates to a foldable and collapsible instrument stand that upon proper adjustment simultaneously supports the bottom, the back (or side), and the neck of an instrument, such as a string instrument.

BACKGROUND

The prior art currently offers a variety of instrument stands to meet the basic needs of musicians. In some settings, such as primary and secondary school music classrooms, a simple stand that can hold a plurality of instruments will often suffice and may be preferred due to cost and space considerations. For example, the utility patent (U.S. Pat. No. 6,540,182) to Wilfer teaches a string instrument stand that may be employed to hold a plurality of such instruments. However, instrument stands that can support a number of instruments simultaneously have several disadvantages. First, they tend to be somewhat large and generally do not provide secure and stable support when holding instruments. In addition, if built having a sturdy construction, they tend to be heavy and are not easily moved from one location to another. Further, as can be seen in FIG. 1 of Wilfer, stands of this type may not provide for any adjusting to fit a respective instrument. For example, consider the size difference between a stand-up bass, an electric guitar, or an expensive vintage mandolin. To safely provide even a minimal level of support (e.g., somewhat precarious support) for this variety of string instruments would prove difficult, if not impossible, for a stand such as that taught by Wilfer.

When considering professional musicians, who often must transport their instruments, cases, and associated gear, an ideal stand would preferably be at least partially foldable, light weight, strong, and provided for fully supporting the various portions of the instrument. All this is preferable, while securely supporting a plurality of portions of the instrument, while preventing an easy knocking or toppling over of the instrument. Unfortunately, known lightweight and foldable instrument stands taught by the prior art are often structured with 3-point tripod (triangular footprint) base arrangements, and tend not to be very stable. Many of these exist in the prior art. A few possibly relevant examples may be found in Schoenig (U.S. Pat. No. 5,029,796) and Gracie (U.S. Pat. No. 5,622,344). In addition, as with the first class of stands discussed above, there is often no provision provided for fully supporting an instrument, in a robustly adjustable fashion, as taught by the collapsible instrument stand of the present invention.

Yet another class of instrument holding prior art inventions can be found in what may be termed multifunction instrument stands, which are structured for holding or at least partially supporting an instrument while providing at least one additional function. Several of many available examples can be found in Vail (D477,718), Vail (U.S. Pat. No. 6,585,315), and Brown (U.S. Pat. No. 6,945,597).

As understood by skilled individuals, a simple, robustly adjustable, and fully foldable instrument stand is most desirable. A most preferred structure would have a simple construction that reduces the number of constituent portions and is easy to set-up. Further, when considering high quality string instruments, which often have finely finished and highly polished surfaces, a preferred instrument stand would provide a secure, full, and possibly cushioned supporting of most if not all major portions of an instrument placed upon the stand.

Accordingly, the present invention teaches an improved instrument stand, structured to properly support and securely hold an instrument while distributing the weight of the instrument over a significantly greater area than present prior art stands. In addition, it would be most desirable to provide this instrument stand having a stable base, and a fully foldable structure that is easy to transport. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

The above provided Background section is included to provide a quick and concise overview of several prior art instrument stands and possible motivations for at least a portion of the features of the present invention. This Background section is not intended to provide a complete and exhaustive summary of all prior art instrument stands that may be deemed related to this invention. Further, the content of the Background section is not intended to limit the scope and or meaning of the claims.

SUMMARY OF THE INVENTION

In accordance with the present invention, a collapsible instrument stand includes a base arranged for placing upon a support surface, such as a ground or floor surface. The base is structured with a front and a back, and preferably has a stable rectangular footprint. A first support portion is most preferably pivotally coupled to at least one of the base (proximate to one of the front or the back) and a second support portion. The first support portion is pivotally coupled to be movable for placing in either a folded position or a substantially upright position. When in the substantially upright position the first support portion is structured for supporting a back (or possibly a side) of an instrument. For example, if the instrument is a guitar, the first support portion is preferably arranged to support the back deck of the body of the guitar.

The included second support portion is pivotally coupled to at least one of the first support portion and the base. The second support portion is movable, by way of the included pivotal coupling(s), between a folded position and an extended position, and is further structured such that when in the extended position the second support portion provides for a contacting and supporting of a bottom surface of the instrument.

Another structure included with preferable embodiments of the collapsible instrument stand of the invention is an adjustable neck support. The adjustable neck support may include a slidably mounted elongated support post, and an adjustable head structure. Preferably the elongated support post of the adjustable neck support is slidably coupled to a second end of the first support portion such that the elongated support post is slidably movable to any position between a fully retracted position and a fully extended position. This provides for a height adjustment of the adjustable neck support. Similarly, a head structure of the adjustable neck support may be slidably coupled to an upper end of the elongated support post, and slidably movable substantially orthogonally to the longitudinal axis of the elongated support post (and typically also to the first support portion). The slidable coupling of the head structure, providing for the substantially orthogonal motion, would enable a placing of an 'instrument neck contacting portion' of the adjustable neck support in any position between a first retracted position and a second extended position. This adjustment may be termed a depth adjustment.

Importantly, the collapsible instrument stand, and preferred structures thereof, are specifically provided to enable the instrument stand to be placed in either one of a collapsed state or a deployed state. The collapsed state provides for a substantial folding and collapsing of the structures of the instrument stand wherein the base, the first support portion, and the second support portion are folded nearly and substantially flat, with each portion still pivotally coupled to at least one other portion. It may also be noted that when in the collapsed state, each of the base, first support portion, and second support portion, are closely spaced and substantially parallel. Further, as will be discussed hereinafter in greater detail, when in the deployed state the instrument stand may be clamped onto an instrument case for transport therewith.

In contrast, the deployed state represents a state wherein the instrument stand is substantially ready to hold, and preferably securely support an instrument. When in the deployed state, the first support portion is fixed in the substantially upright position, the second support portion is fixed in the extended position, and as a function of the instrument to be held the (compound) adjustable neck supporting head structure is available for adjusting a height and a depth of the neck supporting portions. When a collapsible instrument stand of the invention is properly adjusted for a respective instrument, a placing of the instrument upon the stand will preferably result in a simultaneous supporting of a plurality of locations of the instrument. These locations would ideally include a bottom portion, a back (or possibly side) portion, and a neck portion/region. For example, when a string instrument is placed upon a properly adjusted collapsible instrument stand of the invention, the body bottom, the back deck of the body, and the neck (below and or proximate to an included head stock) will each be supported by instrument contacting surfaces of the present invention.

BRIEF DESCRIPTION OF THE DRAWINGS

In the drawings, like elements are assigned like reference numerals and designations. The drawings are not necessarily to scale, with the emphasis instead placed upon the principles of the present invention. Additionally, each of the embodiments depicted is but one of a number of possible arrangements utilizing the fundamental concepts and features of the present invention. The drawings are briefly described as follows.

PARTIAL LIST OF REFERENCE NUMERALS

Figure 1:
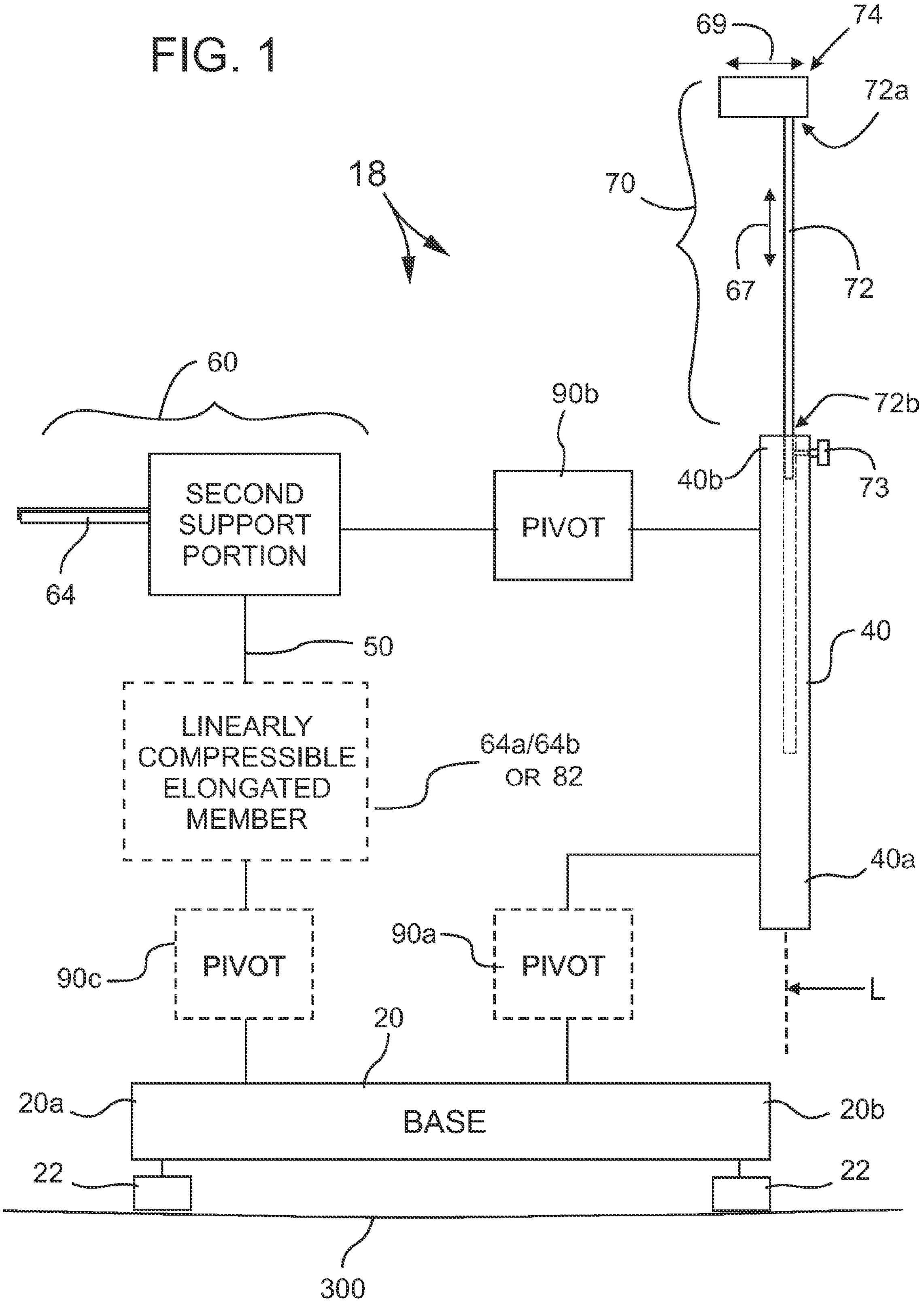
FIG. 1 depicts a conceptual block diagram of a generalized preferred embodiment of the collapsible instrument stand of the present invention.

| | |
|---|---|
| 18 | collapsible instrument stand (generalized) |
| 18a, 18b | collapsible instrument stand (alternates) |
| 20 | base |
| 20a | front (of 20) |
| 20b | back (of 20) |
| 22 | casters |
| 40 | first support portion |
| 40a | first (lower) end of 40 |
| 40b | second (upper) end of 40 |
| 50 | rigid coupling |
| 60 | second support portion |
| 64 | parallel elongated members |
| 64a/64b | linearly compressible elongated member (ex-1) |
| 82 | linearly compressible elongated member (ex-2) |
| 66 | (rigid) cross member |
| 67 | height motion arrow |
| 69 | depth motion arrow |
| 70 | adjustable neck support |
| 72 | elongated support post |
| 72a | upper end (of 72) |
| 72a' | slide block |
| 72b | bottom end (of 72) |
| 73 | support post locking knob |
| 73a | upper support post locking knob |
| 74 | adjustable head |
| 74a | (alternate) adjustable head |
| 75a | head locking knob |

-continued

| | |
|---|---|
| 75b | head locking threaded rod |
| 75c | locking nut |
| 75d | case engaging head bumper |
| 76 | head structure |
| 76a | concave recess |
| 76b | stepped adjustment slot |
| 76b-1 | top slot portion |
| 76b-2 | bottom slot portion |
| 78 | strap anchoring post |
| 78a | strap anchoring tab |
| 79 | neck securing strap (band) |
| 82 | linearly compressible elongated member |
| 82a | sleeve or cylinder |
| 82b | piston |
| 84 | removable coupling |
| 86a, 86b | tube or tube portions |
| 90a-90c | hinge or pivot |
| 92 | notch locking arrangement |
| 92a | cross bar |
| 92b | semicircular cutout or semicircular notch |
| 94 | bumper holes |
| 96 | adjustable body bottom bumpers |
| 96a | bottom bumper rod |
| 98 | cushioning material |
| 100 | guitar carry case |
| 110 | handle of 100 |
| 200 | guitar |
| 300 | ground or support surface |
| Al | angle between 20 and 40 |
| A2 | angle between 40 and 60 |
| F, F2 | applied directed force or point force |
| L | longitudinal axis or plane of 40 |

DETAILED DESCRIPTION OF EMBODIMENTS OF THE INVENTION

Before providing a detailed description of the preferred embodiments of the invention, along with preferable constituent components thereof, it is important to establish the definition of a number of descriptive terms and expressions that will be used throughout this disclosure. When referring the embodiments of the present invention, the terms ‘stand’, ‘collapsible stand’, ‘collapsible instrument stand’, and ‘foldable and collapsible instrument stand’, may all be considered equivalents. The term ‘substantially upright position’ will be used to describe the first support portion of the invention when in a position to support a portion of an instrument placed upon the instrument stand. More specifically, the first support portion will be almost vertical, but tilted back a predetermined number of degrees. For example, a possibly preferred range of angles with respect to a base or base portion, would place the first support portion at an angle of 70 to 89 degrees, or equivalently 1 to 30 degrees off a truly orthogonal angle with respect to the base. The actual angle, shown as angle A1, may be determined by the actual instrument to be placed in the instrument stand. The terms ‘extended’ or ‘extended position’ when employed with descriptions of a second support portion of the invention, would most preferably place the second support portion at an angle that is approximately 90 degrees rotated from the first support portion. However, in the most preferred embodiments of the invention, the actual angle desired may be 90 degrees, plus 0 and up to minus 10 to 15 degrees. As with the first support portion, the actual optimal pre-selected angle, which is shown as angle A2, may be best determined by the specific instrument to be supported and securely held in the stand. The terms ‘coupled’, ‘coupling’, ‘coupled to’, etc., are to be understood to mean that two or more described items are either directly connected together, or alternately, connected to each other via one or more additional, possibly implied or inherent structures or components. For example, when considering the ‘pivotal coupling’ of the first support portion to the second support portion, the coupling may be made by a simple press fit pin or dowel. Alternately, the pivot may be established about a common screw-top nut and bolt, or an additional and appropriate hinge structure. Essentially, any suitable arrangement for pivotally coupling and fixing two or more portions of the invention is to be considered within the scope of the appended claims. Other important terms and definitions will be provided, as they are needed, to properly define the present invention and its associated novel characteristics and features.

Referring now to the drawings, FIG. 1 provides a high level block diagram of an instrument stand 18 in accordance with the invention. A base 20 is arranged for placing upon a ground or other support surface that is typically substantially flat and often level. The base is structured having a front 20*a* and a back 20*b*, which may be alternately and equivalently termed a front end or edge 20*a* and a back end or edge 20*b*. Further, a preferred base 20 of the invention will be structured to provide a ‘non-triangular foot print’.

A first support portion 40 is arranged with a first end 40*a* and a second end 40*b* and is structured for supporting a back, or possibly a side, of an instrument. For example, as illustrated, the depicted embodiments of the first support portion may be best suited for supporting a back deck of a string instrument.

Preferably, the first support portion 40 is pivotally coupled to the base 20 proximate to one of the front 20*a* or the back 20*b* of the base. The included pivotal couplings enable the first support portion 40 to be moved (e.g., pivoted or rotated) for placing in either one of a folded position (substantially parallel to the base) or a substantially upright position. Importantly, the first support portion 40 may be provided of any suitable structure available for supporting a back (e.g., a back deck), or alternately a side, of an instrument when in the substantially upright position. A simple open frame structure will be discussed for clarity and simplicity. Other more elaborate structures are certainly possible and providable by skilled persons who have reviewed and fully understand this disclosure.

Returning to FIG. 1, a second support portion 60 is further included. The second support portion 60 is preferably pivotally coupled via one or more pivots, such as pivot 90*b* and or pivot 90*c*, to at least one of the first support portion 40 and the base 20. The pivotal couplings are provided such that the second support portion 60 is movable between a folded position and an extended position. Importantly, when the second support portion 60 is in the extended position, it is structured for contacting and supporting a bottom or bottom surface of the body of the instrument. When extended, a plane of preferable embodiments of the second support portion 60 may be approximately orthogonal to a plane or a longitudinal axis ‘L’ of the first support portion 40 (see FIG. 1).

Figure 2A:
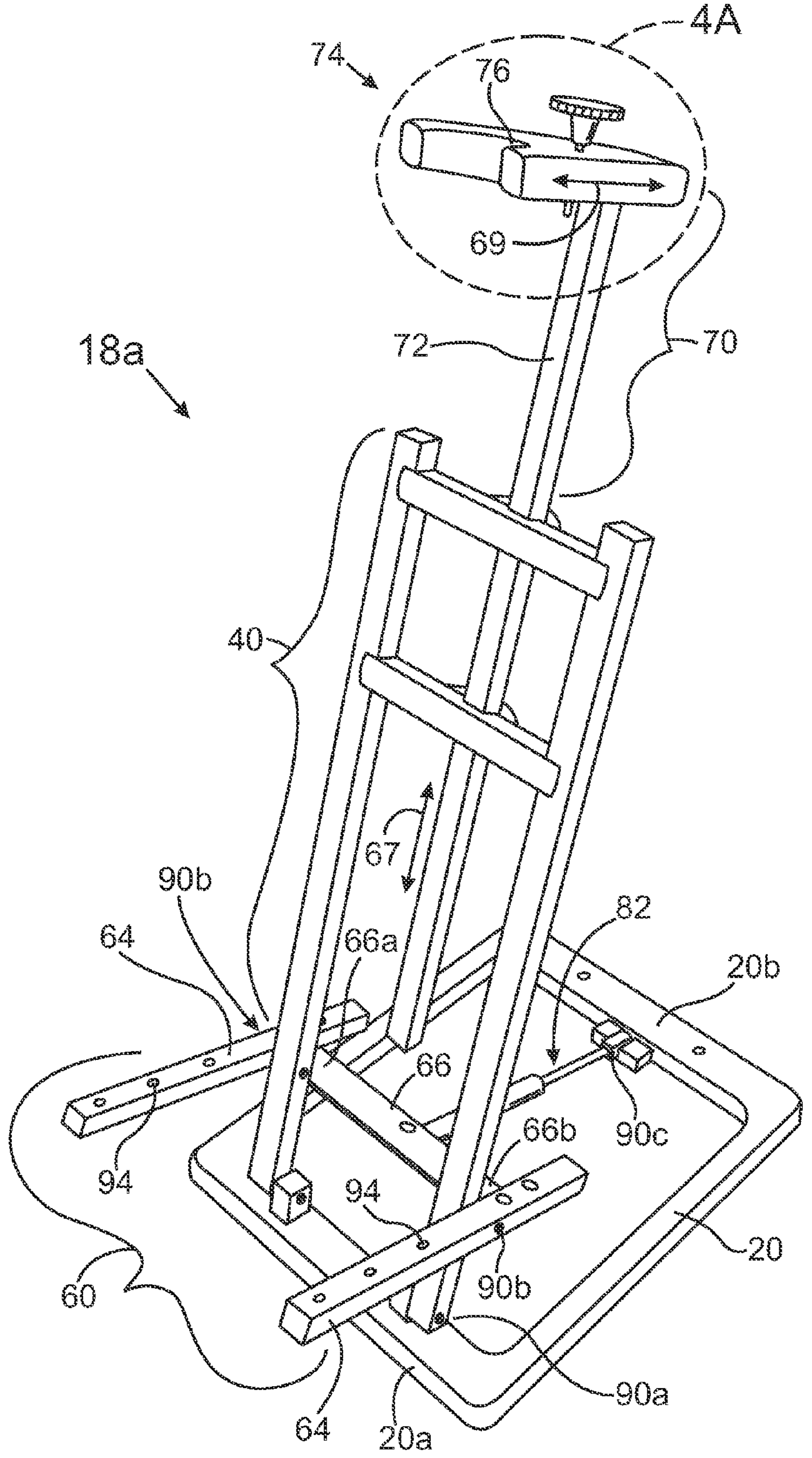
FIGS. 2A and 2B provide a perspective view and a side view, respectively, of a first preferred embodiment of the invention that is consistent with the depiction of FIG. 1.
Figure 2B:
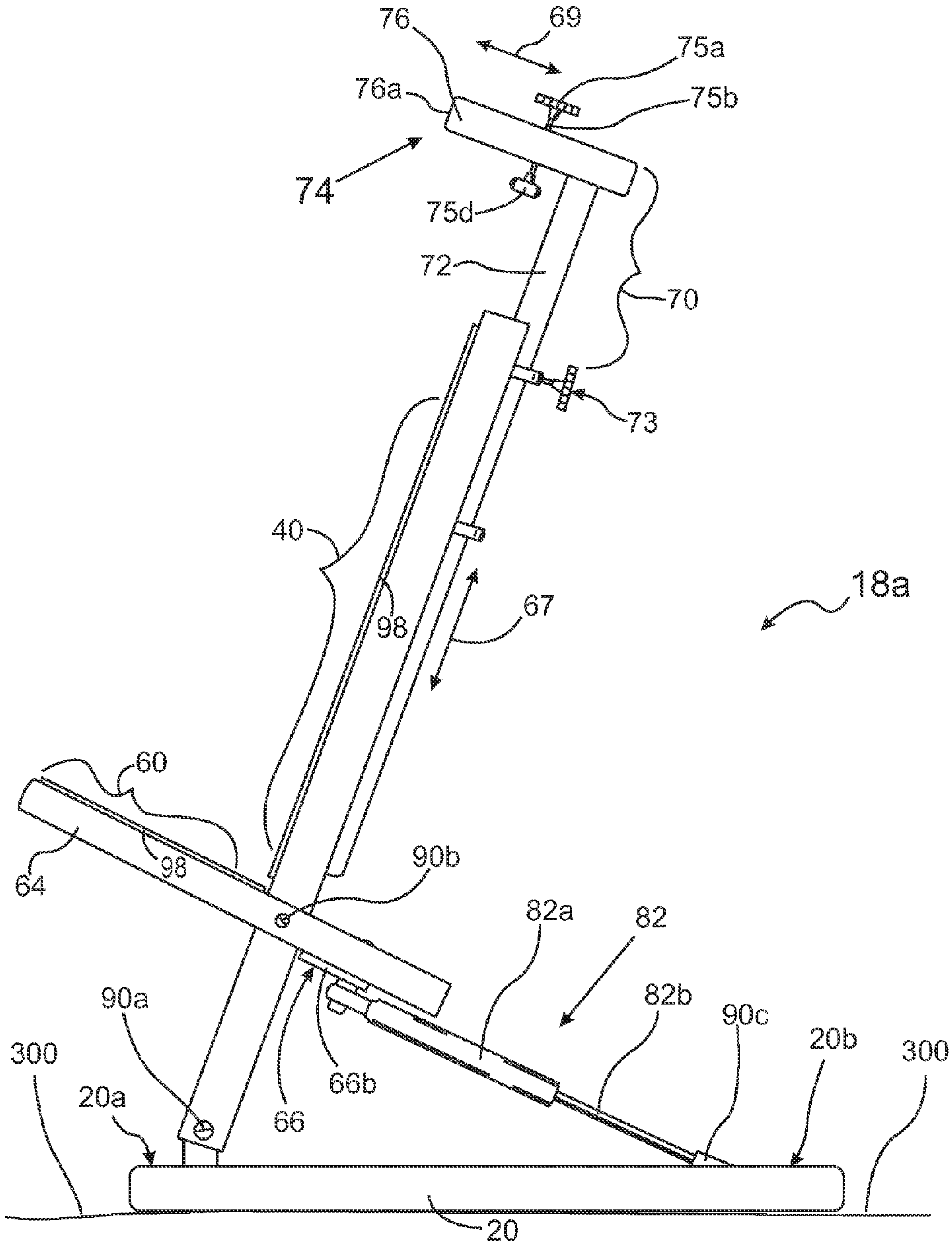
Figure 3:
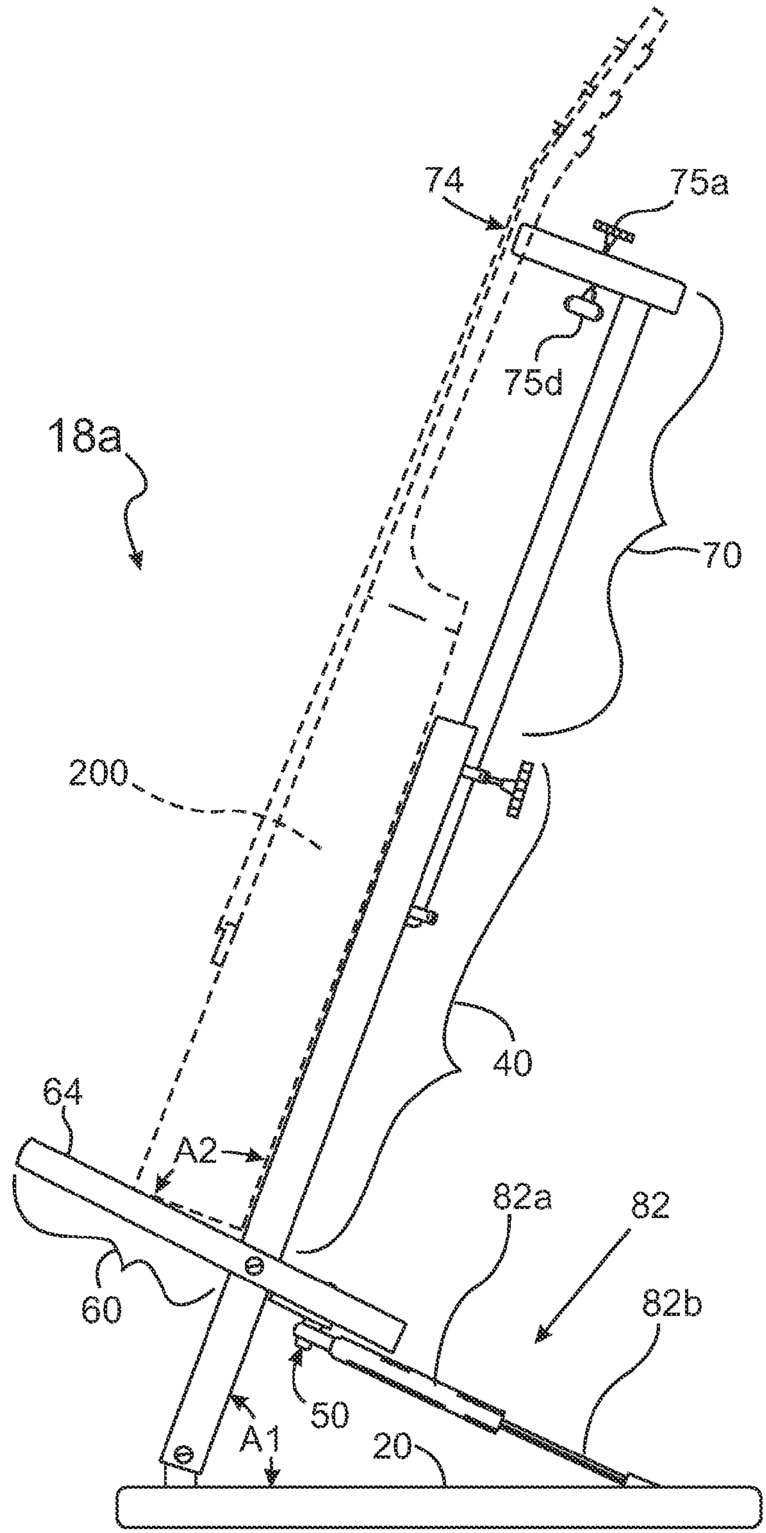
FIG. 3 illustrates a side view of the embodiment of FIGS. 2A and 2B in a fully deployed state with the neck support portion adjusted and substantially extended, such that the instrument stand is ready for use in fully and properly supporting a string instrument (as shown in a dashed outline).

Turning again to FIG. 1, and also shown in FIGS. 2A, 2B, and 3, yet another important structure providable with the present invention is depicted. A neck supporting structure that is fully adjustable is structured for supporting for the neck of the instrument placed upon the stand. In preferred embodiments the adjustable neck supporting means, such as adjustable neck support 70, is included and structured to support a compound adjustment of the neck contacting surface. That is, the neck contacting surface is preferably adjustable in two (2) ways—which may termed ‘height’ and ‘depth’.

Figure 4A:
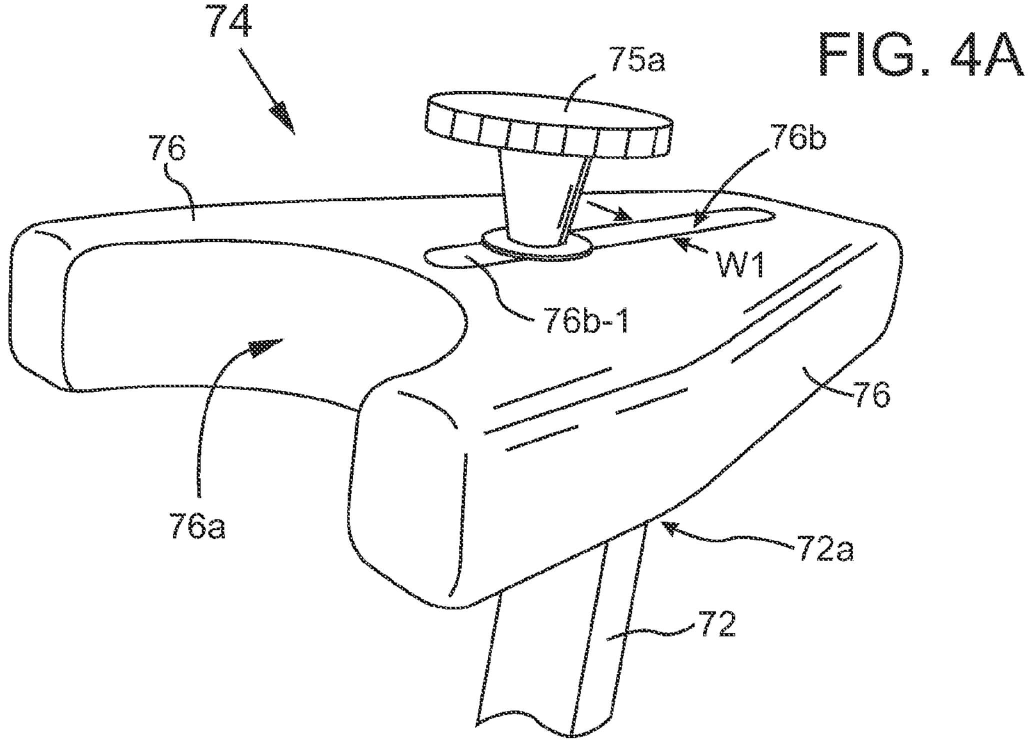
FIGS. 4A and 4B illustrate perspective views of a first embodiment of an adjustable head of an adjustable neck support.
Figure 4B:
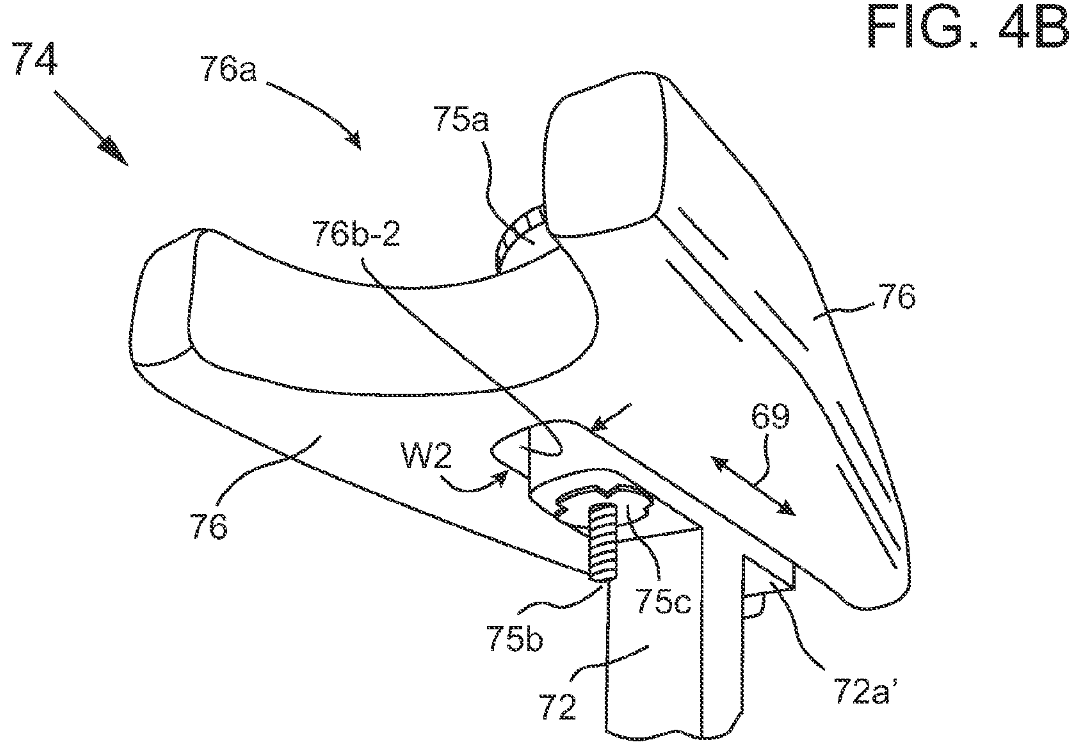
Figures 4C, 4D:
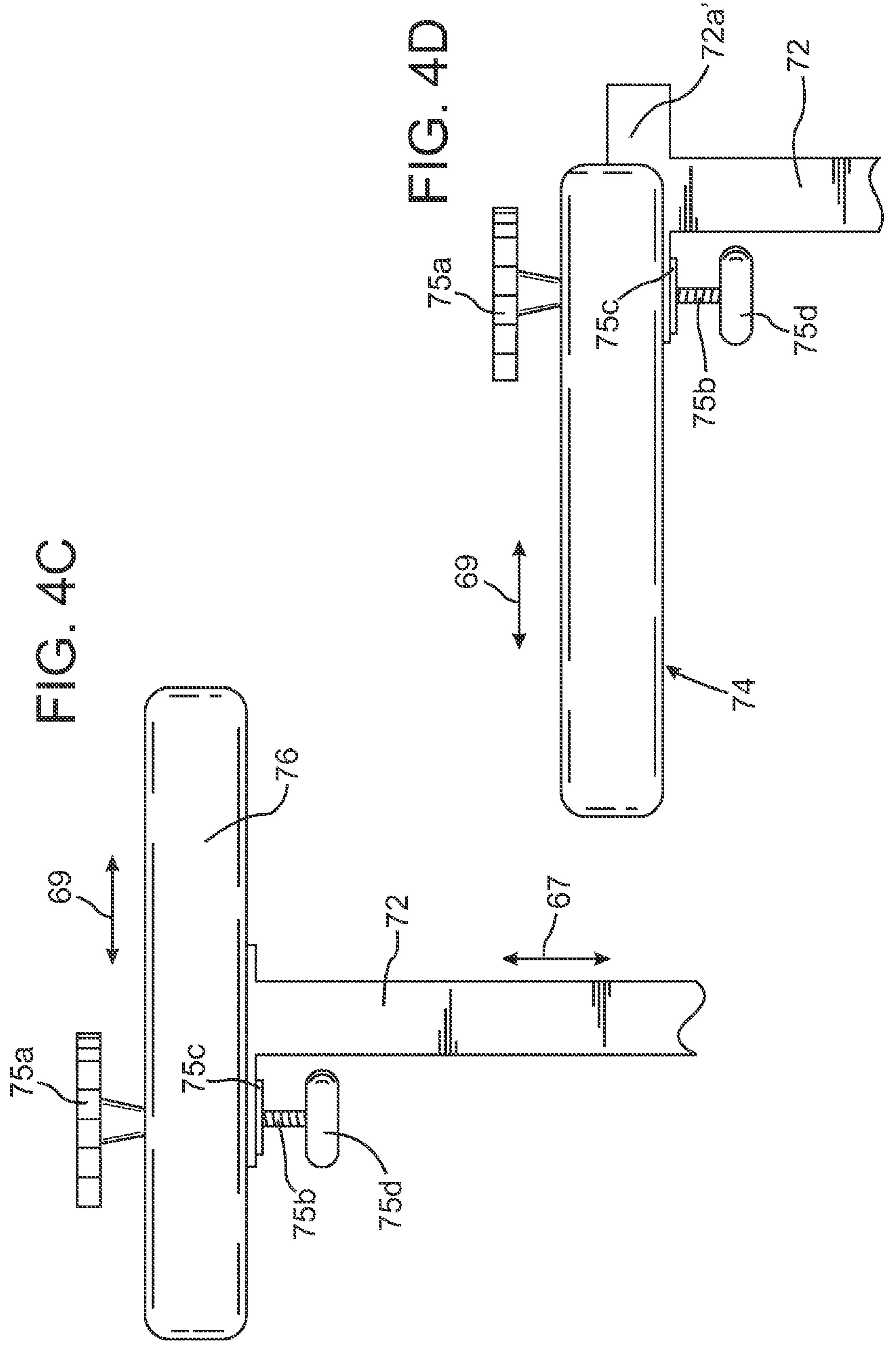
FIGS. 4C and 4D illustrate side views of the embodiment of FIGS. 4A and 4B, with the head portion depicted in a fully retracted position (FIG. 4C), and a fully extended position (FIG. 4D).

As shown in FIG. 1, and also seen in FIGS. 2B and 4C, the adjustable neck support 70 is preferably provided having at least two slidable couplings to enable up/down adjustment (see height motion arrow 67), as well as in/out adjustment (see depth motion arrow 69). As depicted a member such as elongated support post 72 may be slidably mounted to the second end 40*b* of the first support portion 40, preferably ‘in-line’ with a longitudinal axis L of the first support portion 40. It should be noted that the slidable coupling is arranged such that the elongated support post 72 is slidably movable to any position between a fully retracted position (FIGS. 2B and 6A) and a fully or nearly fully extended position (FIG. 1, FIG. 7, etc.).

Returning again to FIG. 1, the most preferred embodiments of the adjustable neck support 70 may further include a structure for establishing a slidable coupling between the upper end 72*a* (of the elongated support post 72) and an adjustable head 74 (or equivalently the head structure 76.) As understood by skilled persons, the adjustable head 74 enables a sliding movement, providing for in/out adjustment, that is preferably substantially orthogonal to the longitudinal axis L of the elongated support post 72 and the first support portion 40. This orthogonal motion may be termed and considered a depth adjusting motion.

Importantly, an employed slidable coupling would support a motion wherein a user may place and fix the adjustable head in any position between a first retracted position and a second extended position. When in or near the retracted position, a properly adjusted collapsible instrument stand of the invention may be supporting a thin bodied electric guitar. When in a more extended position, the instrument stand may be supporting a thick bodied stand-up bass instrument.

Figure 5A:
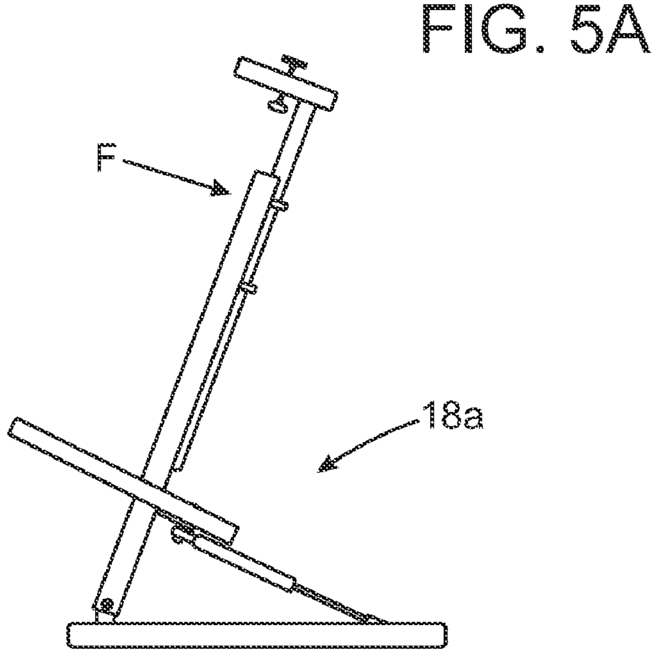
FIGS. 5A, 5B, and 5C illustrate an embodiment of the invention in each of a fully deployed (upright) state, a partially deployed/collapsed state, and a fully collapsed (nearly flattened) state, respectively.
Figure 5B:
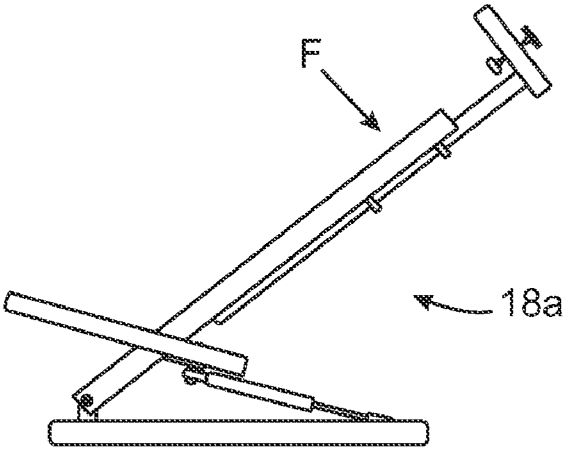
Figure 5C:
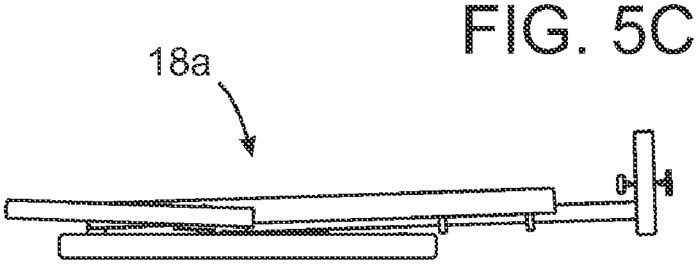
Figure 6A:
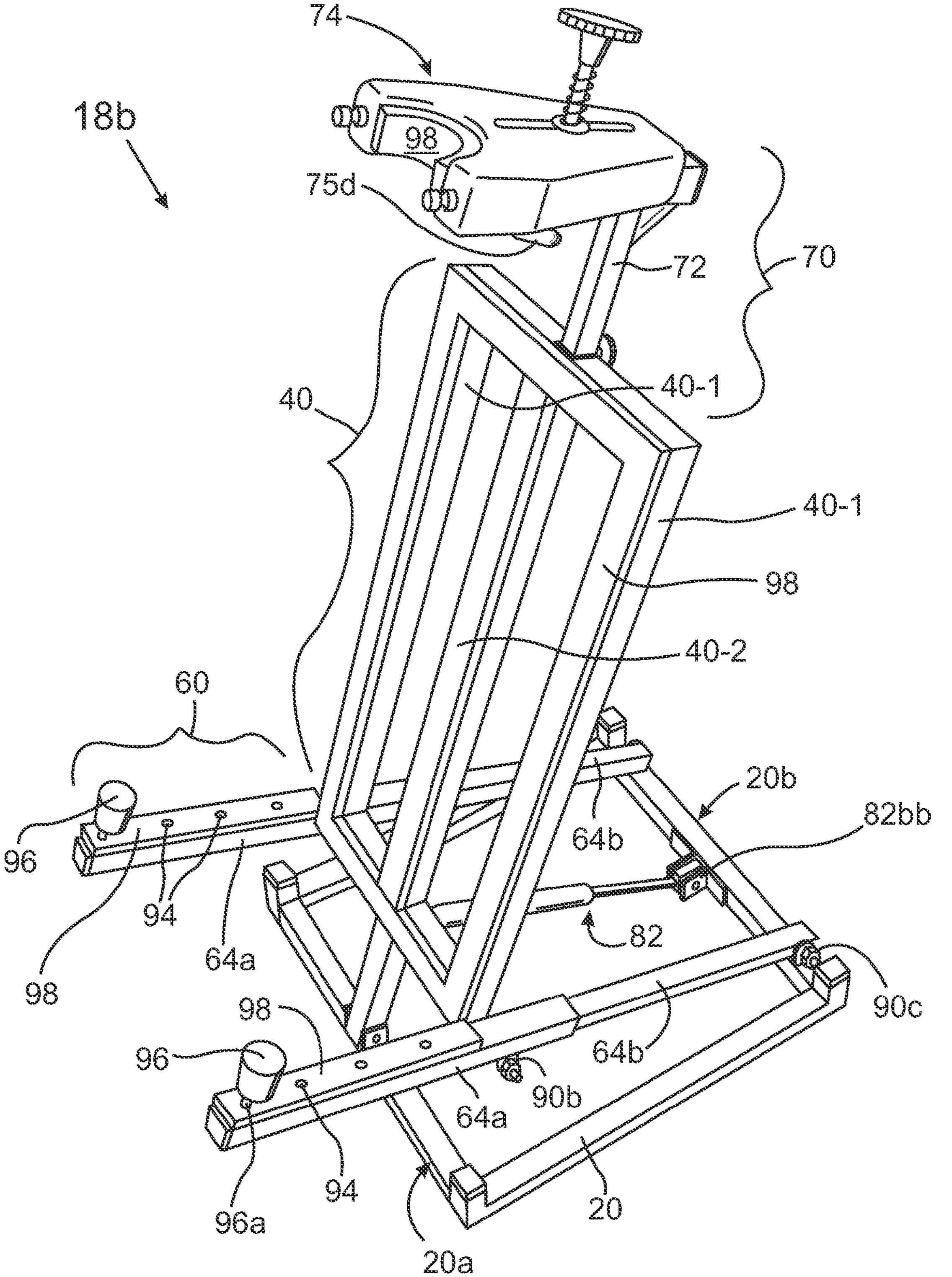
FIG. 6A provides a perspective view of another preferred embodiment of the collapsible instrument stand of the invention, depicted in a deployed state, with the adjustable neck support fully retracted.
Figure 6B:
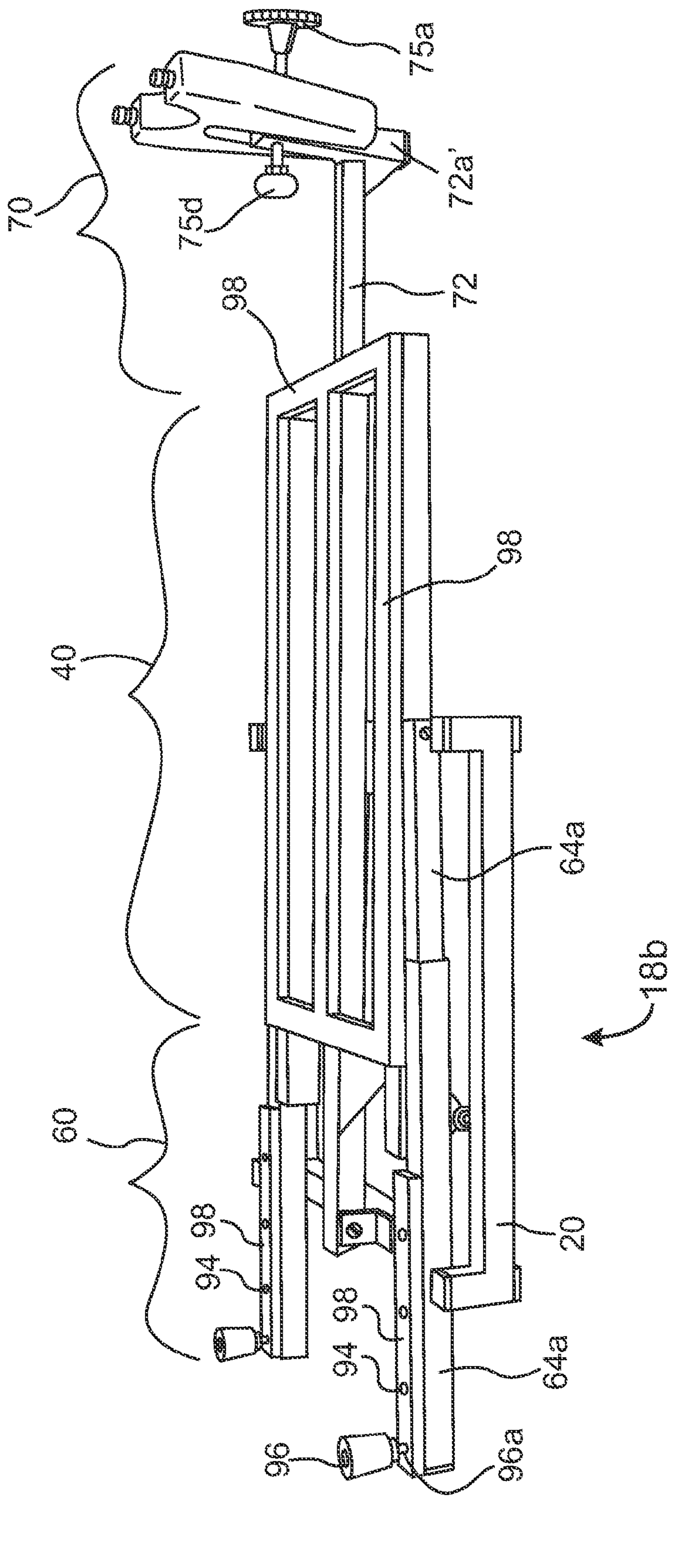
FIG. 6B provides a perspective view of the embodiment of FIG. 6A in the collapsed (folded) state, and ready for clamping to an instrument case.
Figure 7:
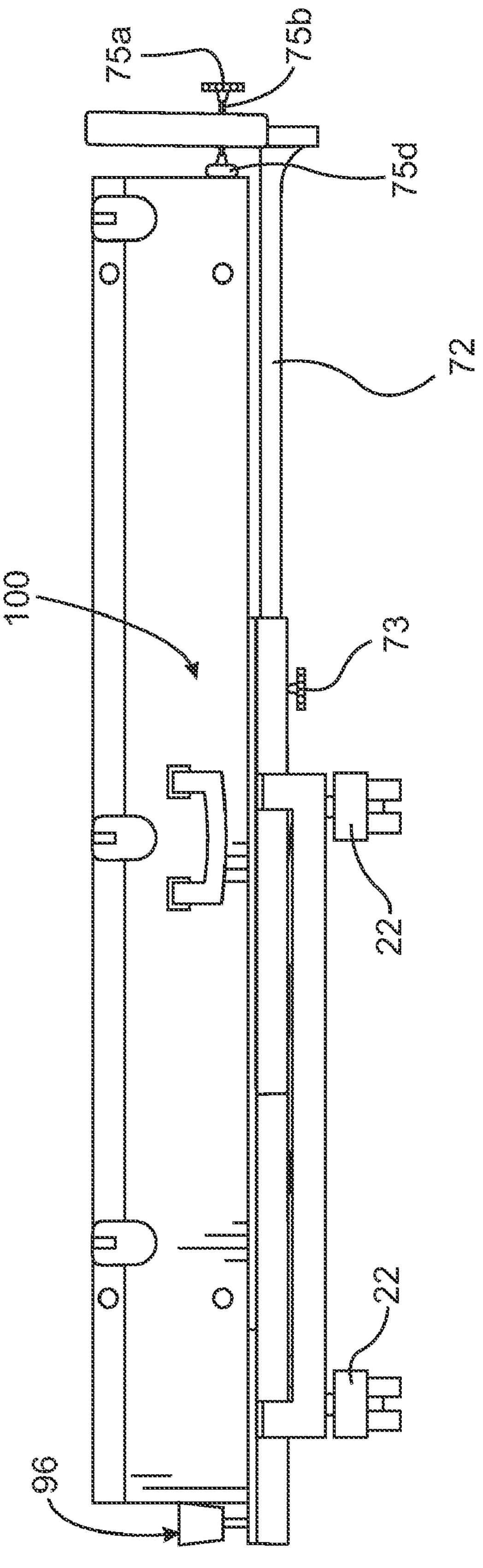
FIG. 7 depicts the embodiment of FIGS. 6A through 6D shown removably clamped onto an instrument case for transport therewith.

As shown in the included figures, the collapsible instrument stand 18 is specifically structured for being placed in either one of:

a) a collapsed state, as shown in FIGS. 5C, 6B, and 7, useful for carrying, transporting, and or storing the instrument stand away until next needed; or b) a deployed state, as shown in FIGS. 2A-3, 6A, and 8A, wherein the instrument stand 18 is available for accepting and securely holding an instrument placed upon the stand.

Therefore, when in the collapsed state, preferred embodiments of the collapsible instrument stand will provide for the base 20, the first support portion 40, and the second support portion 60 to be folded (relatively) ‘nearly flat’ with each closely spaced and substantially parallel to each other. It is to be understood, as clearly shown in FIG. 5C, one or more of the base, first support portion, and the second support portion, may not be exactly parallel, but nearly or substantially parallel. When in the collapsed state the first support portion and or the second support portion may be described as being ‘folded nearly flat’.

Further, when in the deployed state, the first support portion 40 is in the substantially upright position ready to support a bottom of the instrument, the second support portion 60 is in the extended position, and the instrument stand is ready and available to hold and support an instrument. An additional adjusting of the height and depth of the adjustable neck support 70 of the instrument stand 18 may be required. Again, is it preferable that when an instrument is placed in a properly adjusted instrument stand of the invention, there is effected a simultaneous supporting of each of a bottom area or portion, a back area or surface, and a neck or upper portion of the instrument. For example, as shown in FIG. 3, when properly adjusted, an instrument such as a guitar 200, which is depicted in a dotted outline is supported at the bottom, the back deck, and the upper neck portion.

Turning again to FIG. 1, the second support portion 60 may be coupled to the base 20 by way of one or more linearly compressible elongated members. The linearly compressible elongated members, may be provided in differing configurations. For example, as shown in FIG. 6A, a linearly compressible elongated member(s) may be provided by a combination of 64*a* and 64*b*, which may or may not be spring loaded, possibly damped using a fluid arrangement, and biased to an extended or maximum length position. The linearly compressible elongated members, such as 64*a*/64*b* (of FIGS. 6A and 6B) and 82 (of FIGS. 2A, 2B, and 3), may be preferably fixed to the base 20 at an end), and one or both of the first support portion 40 and the second support portion 60. Further, a number of varied structures providing an equivalent function to the linearly compressible elongated members 64*a*/64*b* and 82 may be employed.

Turning now FIGS. 2A and 2B, a first preferred embodiment of the invention, which is consistent with the block diagram of FIG. 1, is illustrated in each of a perspective view and a side view, respectively. The collapsible instrument stand 18*a* of FIGS. 2A and 2B, is depicted in the deployed state and clearly showing embodiments of the first support portion 40, the second support portion 60, and the adjustable head 74. The base 20, as well as the first support portion 40 are depicted having a substantially open and rectangular frame structures—with each defining a plane passing through the frame structure (not explicitly labeled). This provides a base 20 with a (non-triangular) stable footprint for contacting a ground surface 300 (FIGS. 1 and 2B), and a first support portion 40 with a plane of surface area for contacting the instrument back (or possibly the side). The second support portion 60 is depicted formed of at least two spaced apart and substantially parallel elongated members 64. In a most preferred embodiment a cross member 66 may be included, as shown in FIGS. 2A, 2B, and 3. It may be noted that the second portion 60 of FIGS. 2A, 2B, 3, and 5A, may be structured having the cross member 66 arranged substantially parallel to the first end 20*a* and second end 20*b* of the base 20. Further, the cross member 66 may be a rigid structure, and arranged with a first end 66*a* and a second end 66*b*. As shown, this preferred embodiment includes a first parallel elongated member 64 that may be fixed at the first end 66*a* (at a right angle), while a second parallel elongated member 64 is shown fixed at the second end 66*b* in a like fashion. The illustrated embodiment, thereby establishing a spaced and parallel relationship between the parallel elongated members 64, which as illustrated may provide a substantially u-shaped structure (when including the cross member 66). The pivotal coupling of the first support portion 40 and the second support portion 60 is provided by pivots 90*b*, which may be structured as shown, using a simple through hole and screws. Further, each included linearly compressible elongated member 82 of the embodiment of FIGS. 2A through 3 may be most preferably oriented and maintained substantially parallel to each of the spaced parallel elongated member portions 64 (as best seen in FIGS. 2B and 3). That is, even as the collapsible instrument stand 18*a* is moved from the deployed state (FIGS. 2A, 2B, 3, and 5A), to an intermediate state (FIG. 5B), and finally into the collapsed state (FIGS. 5C, 6B, and 7), a substantially parallel orientation of items such as the linearly compressible elongated member(s) 82 and the included parallel elongated members 64, may be maintained.

It may also be noted, the first preferred embodiment of the collapsible instrument stand 18*a* of FIGS. 2A through 3 and FIGS. 5A through 5C, is structured such that when a sufficient force F is applied, as indicated in FIG. 5A, the collapsible instrument stand 18*a* is moved from the deployed state to the collapsed state. In a preferred embodiment, as the force F is applied (as shown) the bias force of an included spring loaded linearly compressible elongated members is overcome. As can be seen, as the first support portion 40 of FIGS. 2A-3, and 5A is moved from the substantially upright position to the folded position, simultaneously the second support portion 60 moves from the extended position to the folded position. When included linearly compressible elongated members 82 may be most preferably provided as being loaded or biased to an open/extended position. For example, a possibly most preferred embodiment of the invention may be provided with a spring or gas loaded linearly compressible elongated member 82, and may be further structured to provide two possibly needed functions:

a) If biased sufficiently to an open/extended position, an embodiment of a spring or gas loaded linearly compressible elongated members will assist the user when setting up the collapsible instrument stand 18*a*, when going from the collapsed state to the deployed state; and b) The spring biasing to the open/extended position may also serve to hold the instrument stand in the deployed state, even when loaded with an instrument of notable weight, such as a stand-up bass.

As best seen in FIGS. 2A, 2B, 3, and elsewhere, a plurality of knobs, which may be termed 'locking knobs', may be included for adjustment purposes. For example, loosening support post locking knob 73 provides a simple example of a means enabling the adjusting of the position of the elongated support post 72, and thereby the height of the adjustable head 74. Once knob 73 has been loosened, the adjustable head structure 74 may be moved to any position, between the fully retracted position and the fully extended position, and locked in the selected position. It should also be noted that the placement of knob 73 may actually be as shown in FIG. 2B (projecting in a rearward direction), or may be arranged to project in another direction such as to one side of the first support portion 40 (not illustrated). Alternately, the knob 73, as well as other knobs of the invention, may be provided by lower profile configurations, and thereby not project out as far as illustrated. Indeed, if necessary 'snugger' knobs may be employed, which have little or no rise above a surface.

Figure 6C:
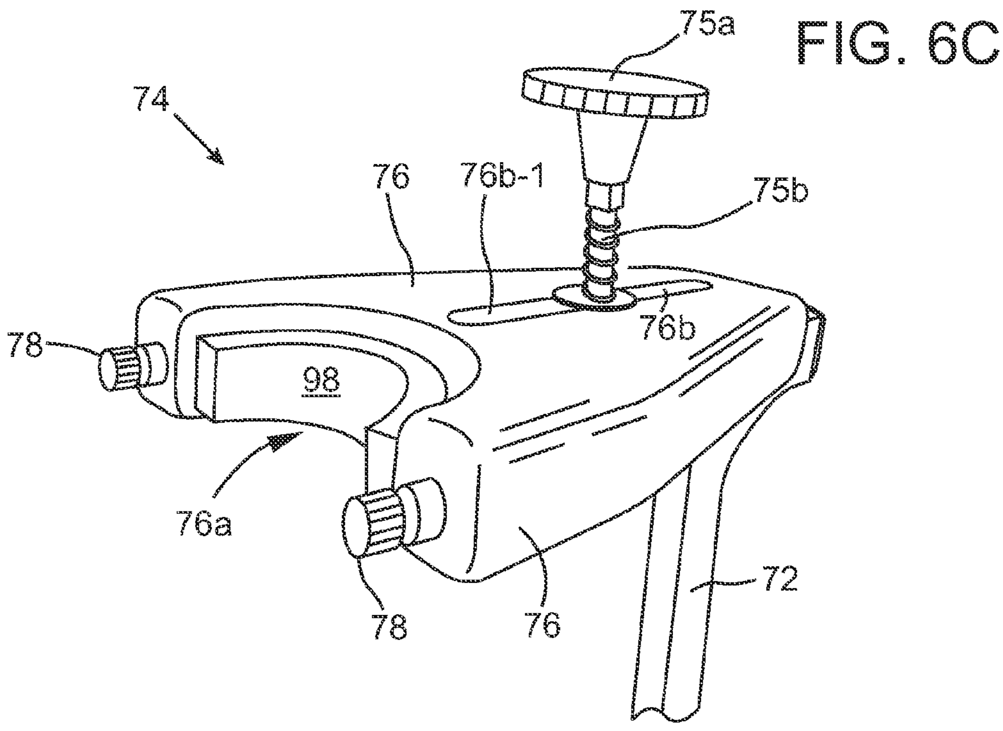
FIGS. 6C and 6D illustrate perspective views of a second possible embodiment of an adjustable head of the neck support portion, structured with a pair of strap holding posts extending from a head structure and arranged for anchoring each end of a neck engaging strap, included for selectively securing the neck of an instrument within a recess of the head structure while the instrument is being held upon the stand of the invention.
Figure 6D:
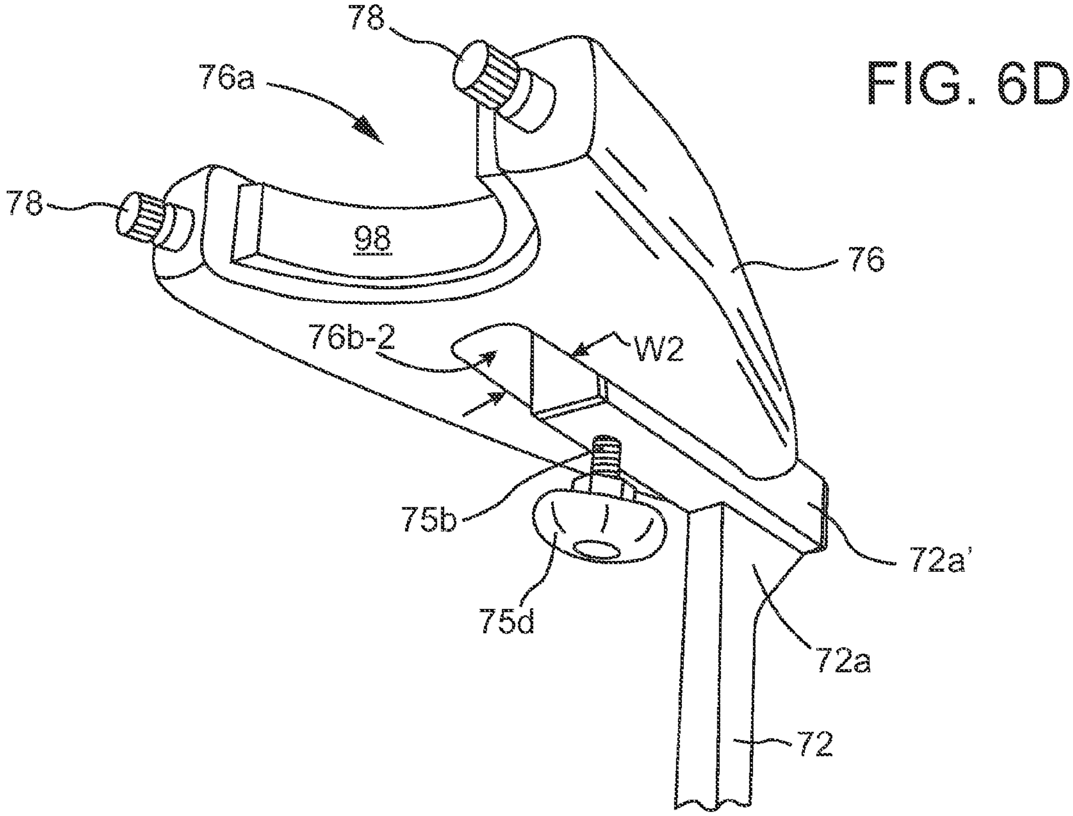

Referring now to FIGS. 4A through 4D, and 6A and 6B, a first low cost, and possibly most preferred embodiment of an adjustable head 74 is depicted. As shown, this exemplary structure includes a head structure 76 that may be provided as a substantially monolithic construction. The head structure may preferably include a concave recess 76*a* for accepting a mid to upper neck portion of the instrument. As best seen in either FIGS. 4A and 6C, the head structure 76 of an adjustable head 74 may be provided having a stepped adjustment slot 76*b*. The stepped adjustment slot 76*b*, as shown, is formed in the head structure by way of a pair of overlapping, superposed, and differently sized slots. For example as shown in FIGS. 4A, 4B, 6C, and 6D, the stepped adjustment slot may be formed with a top slot portion 76*b*-1 being of a narrow width W1, while the bottom slot portion 76*b*-2 is constructed with a wider slot width W2. When included, the stepped adjustment slot 76*b* may be combined with a mating structure provided at the upper end 72*a* of elongated support post 72. One preferred embodiment of such a mating structure, which may be termed a slide block 72*a*', is best seen in FIGS. 4B and 6D. The slide block 72*a*', and equivalent structures, are arranged to enable the head structure 76 to be slidably coupled to a member such as the elongated support post 72 for supporting the orthogonal motion—or equivalently the 'depth adjustment'.

Importantly, the slide block 72*a*' is sized for mating with the bottom and wider portion of the stepped adjustment slot 76*b*-2 to support sliding therein. The top portion 76*b*-1 of the stepped adjustment slot 76*b* is preferably structured so as to provide upper shoulders and top wall portions for the slide block 72*b*' to be slidably supported. The slot also supports the passage of items such as bolts and rods. For example, as shown a (head locking) threaded rod 75*b* may be employed. The threaded rod 75*b* is provided for passing through the stepped adjustment slot 76*b*, from top to bottom, and held and secured between the head locking knob 75*a* and one of:

a) a threaded hole provided, for example, in sliding block 72*a*', which mates to the threads of the threaded rod 75*b* (FIG. 6D); or b) an included locking nut 75*c* (FIGS. 4B, 4C, and 4D), with the threaded rod 75*b* preferably passing through a thru-hole in the slide block 72*a*'.

Figure 9:
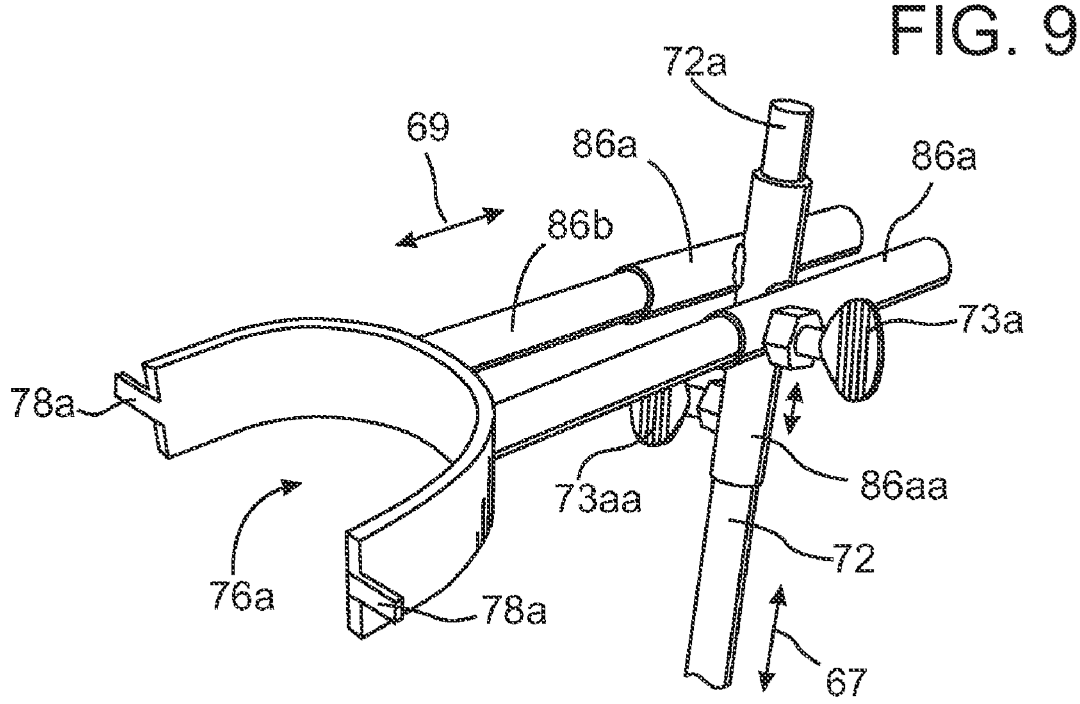
FIG. 9 depicts another possible structure of the adjustable head having a very different head structure and a (telescoping) slidable coupling arrangement.

Accordingly, the head locking knob 75*a*, may for example, be rotated counter clockwise to loosen the head structure 76 for enabling the sliding thereof to a position between the retracted position (FIG. 4C) and the extended position (FIG. 4D). As skilled individuals will appreciate, the functions of structures enabling the slidable coupling of the adjustable head 74 to the elongated support post 72, including the stepped adjustment slot 76*b*, the slide block 72*a*', and the locking knob 75*a*, and others, may be provided by a number of alternate structural arrangements. For example, a basic rack and pinion arrangement (not illustrated) may be employed and provide a slidable coupling that possibly eliminates an explicit locking means. Alternately, a structure as depicted in FIG. 9 may be employed. As shown in FIG. 9, a plurality of tubes 86*a* may be arranged in a spaced and parallel relationship, and fixed to a structure such as a center tube 86*aa*. This arrangement provides for the depth adjustment by loosening flattened thumb screw 73*a* and slidably pushing the tubes (or rods) 86*b* further into, or pulling them further out of outer tubes 86*a*. Similarly, an additional locking knob such as flattened thumb screw 73*aa* may be included to enable center tube 86*aa* to be moved up and down upon a round embodiment of elongated support post 72. This latter arrangement including thumb screw 73*aa* and tube 86*aa*, may be provided for enabling an adjusting the height of adjustable head 74 at the upper end 72*a* of elongated support post 72. Accordingly, the structure of FIG. 9, may be employed to enable a height of the adjustable head 74 to be adjusted and maintained at each of the lower end of the elongated support post 72*b* (using locking knob 73 shown in FIG. 2B) and at the upper end 72*a* (using locking screw 73*a* shown in FIG. 9). Thus, establishing what may be termed a '2-way' adjustability of the height of the adjustable head 74 of FIG. 9. It may be further noted that the configuration of FIG. 9, enables the upper end 72*a* of the elongated support post 72 to be extended upwardly such that when in the deployed state additional accessory items may be fixed or coupled at the upper end 72*a*. These accessory items may include sheet music support structures, microphone mounts/holders, etc.

Figure 10:
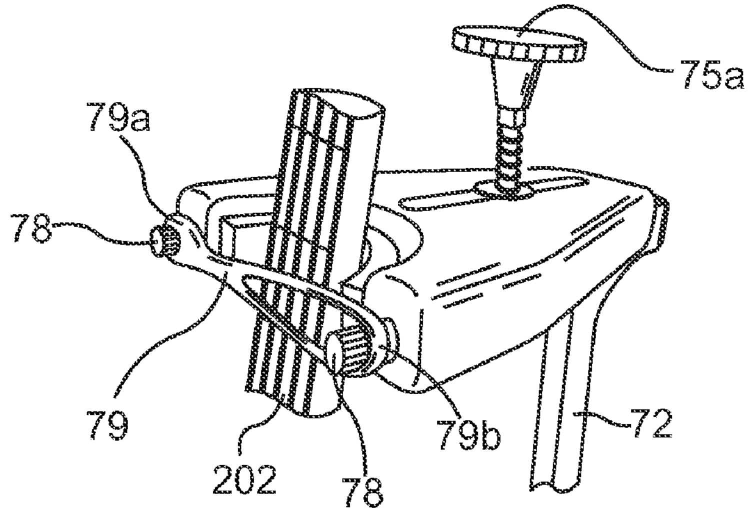
FIG. 10 illustrates an additional means for securing the neck of a string instrument within a concave recess of the head structure of the adjustable head of the invention.

As best seen in FIG. 10, the collapsible instrument stand 18*a* or 18*b*, may configured with at least two spaced strap anchoring posts 78. The spaced strap anchoring posts 78 may be fixed proximate to outer portions of the concave recess 76*a*, and act as anchor points for a strap means 79. The strap means 79 may be made of any suitable and available rubber or elastic material. As clearly shown in FIG. 10 the anchor posts may securely hold the neck of the instrument within the concave recess 76*a*. Regardless of the actual structure employed, once the neck is placed within the concave recess 76*a*, a strapping arrangement, including at least one strap means will be useful for placing across the outer surface of the neck, between suitable anchor points/means, for securing the neck portion of the instrument within the concave recess 76*a*—even if the instrument is accidentally bumped.

Referring to FIGS. 6A and 6B, illustrated is yet another embodiment of a collapsible instrument stand 18*b*, which may be placed in a deployed state or a collapsed state. FIG. 6A provides a perspective view of instrument stand 18*b* depicted in the deployed state, with the adjustable head 74 in a substantially retracted position. In contrast, FIG. 6B provides a side view of the stand 18*a* of FIG. 6A in the collapsed state.

As can be seen best in FIG. 6A, the instrument stand 18*b* includes a first support portion 40 composed of a plurality of outer frame portions, including elongated side members 40-1 and a center frame element 40-2. Importantly, as illustrated the center frame element 40-2 is best provided as a hollow structure, sized to accept the elongated support post 72 in a slidable relationship. This slidable arrangement supports a sliding out, or extending of the elongated support post 72 (FIG. 7), as well as a sliding in (retracting) of the elongated support post 72 (FIGS. 6A and 6B).

As discussed above, the inclusion of linearly compressible elongated members 64*a*/64*b*, along with the pivotal coupling to each of the second end 20*b* of the base 20 and the first support portion 40, enables the collapsible instrument stand 18*b* to be placed in either the deployed state or the collapsed state. Specifically, as the instrument stand 18*b* is changed for the deployed state of FIG. 6A, into the collapsed state of FIG. 6B, each linearly compressible elongated member 64*a*/64*b* is compressed and shortened—supporting the folding and collapsing of the present invention. In addition, if linearly compressible elongated members 64*a*/64*b* are not spring loaded (to assume an extended position), at least one linearly compressible elongated member 82 may most preferably be provided as a spring loaded linear damper that may be gas or liquid filled. It may be noted that if none of the included linearly compressible elongated members 82 or 64*a*/64*b* are spring loaded or gas biased, an additional locking means, may be included. The additional locking means, such as a locking knob that is not unlike locking knob 73, may be employed with one or more members 82 and or 64*a*/64*b*, for holding the instrument stand 18 in the collapsed state and or the deployed state.

Figure 8A:
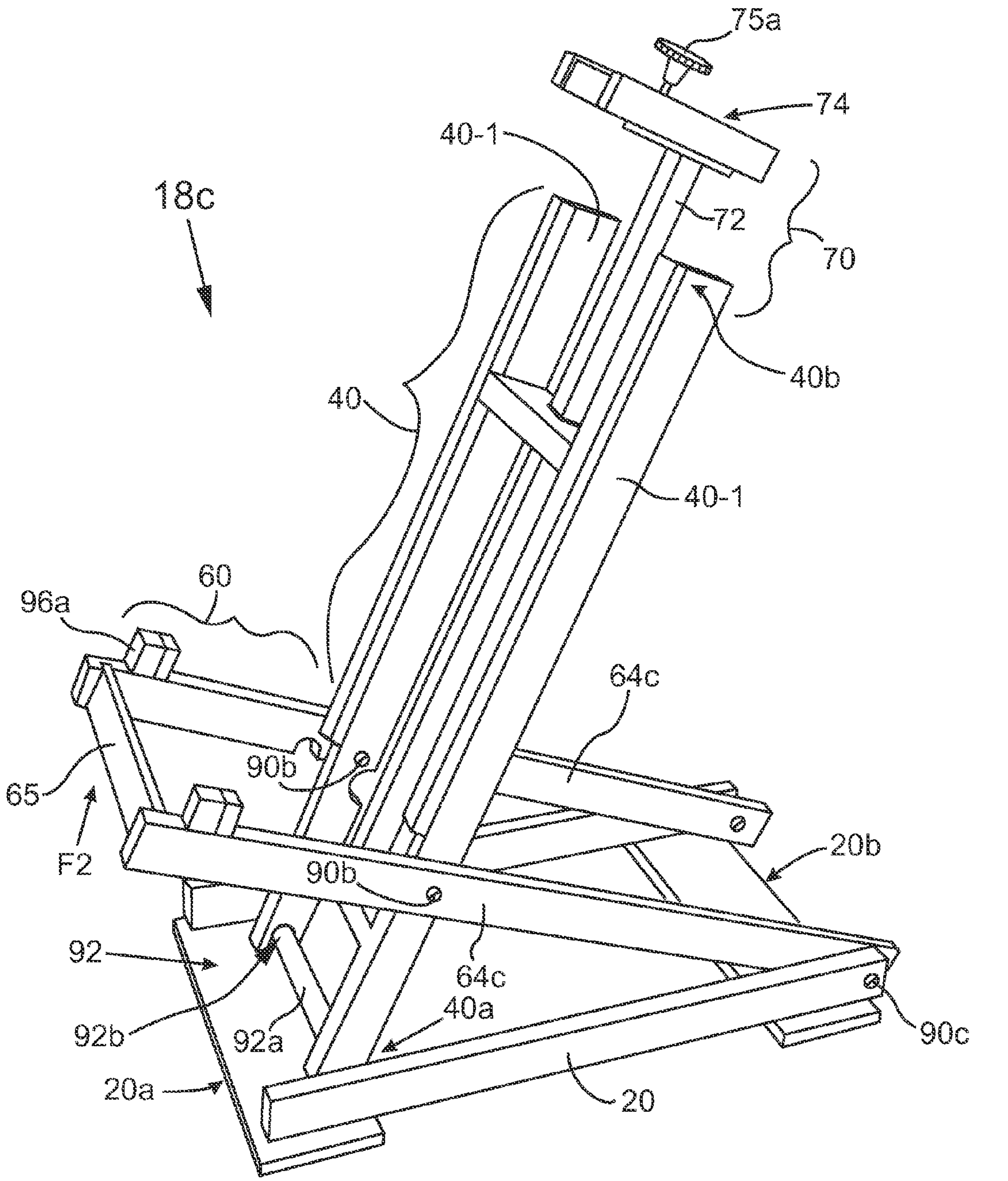
FIGS. 8A and 8B illustrate a perspective view of yet another possible exemplary embodiment of the collapsible instrument stand of the invention.
Figure 8B:
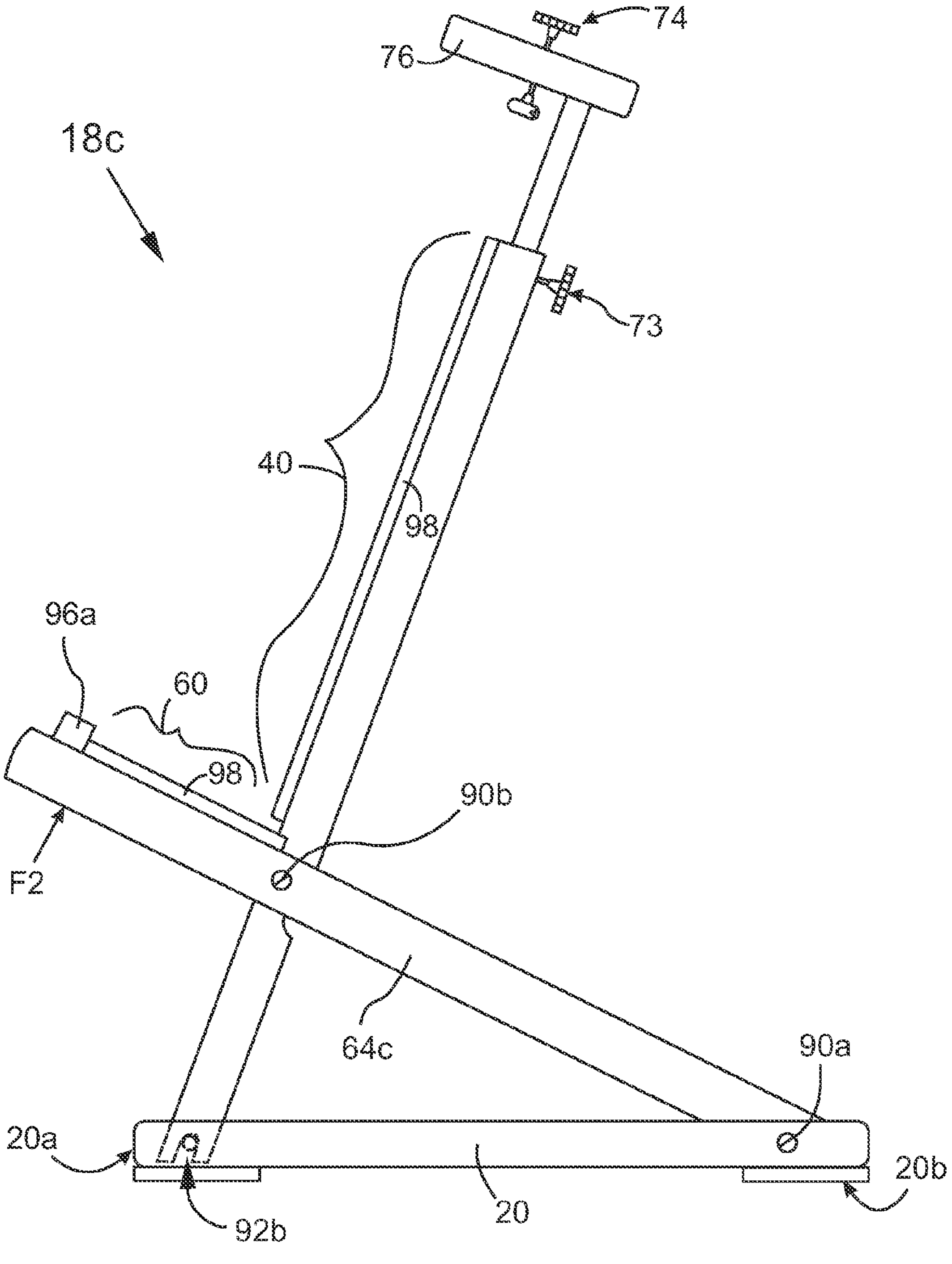

Referring now to FIGS. 8A and 8B, yet another possible embodiment of the collapsible instrument stand of the invention is illustrated. As with previous embodiments, the collapsible instrument stand 18*c* includes the base 20, the first support portion 40, and the second support portion 60. As illustrated, a plurality of pivotal couplings are again provided. The first support portion 40 is pivotally coupled to the second support portion 60 via pivot or pivotal coupling 90*b*. The second support portion 60 is coupled to the base 20 proximate to one of the front 20*a* (not illustrated) or the back 20*b* (as depicted in FIGS. 8A and 8B). The included pivotal couplings enable:

a) the first support portion 40 to be moved (e.g., pivoted or rotated) for placing in either one of a folded position (substantially parallel to the base) or a substantially upright position; and b) the second support portion 60 to be moved (e.g., pivoted or rotated) between the folded position and the extended position.

As discussed hereinabove, when an instrument is placed upon a deployed collapsible instrument stand of the invention, the second support portion 60 is in the extended position for supporting a bottom of the instrument, the first support portion 40 is in the substantially upright position for supporting a back of the instrument, while an adjustable neck support 70 may be provided and adjusted for also supporting a neck of the instrument. This is certainly still the case with the embodiment of FIGS. 8A and 8B.

As clearly shown in FIGS. 8A and 8B, the linearly compressible elongated members, such as 64*a*/64*b* and 82, may be omitted. In addition, the simple application of a force, such as point force F as shown in FIGS. 5A and 5B, will not cause the instrument stand 18*c* to change from the deployed state (FIG. 8A) to a collapsed state (FIG. 5C). More specifically, if there is a need to fold and collapse the instrument stand 18*c* and place it in the collapsed state, an upward force F2, as indicated in FIG. 8A, is first applied to lift/rotate the first and second support portions. Importantly a notch locking arrangement 92 is employed with the embodiment of FIGS. 8A and 8B, to enable the folding and collapsing of the instrument stand 18*c*. The inclusion of this arrangement may be desirable for cost reasons (i.e., omits need for any linearly compressible elongated members) and greater loading capacity (i.e., can support larger and or heavier instruments).

Turning again to FIG. 8A, as shown proximate to the front 20*a* of the base 20, a cross bar 92*a* may be included and securely fixed to base portions in a transverse orientation. Further, each elongated side member 40-1 of the first support portion 40, now has formed at the first end 40*a* a structure, to mate with the cross bar 92*a*. As shown, a substantially cutout or semicircular notch 92*b* may be provided. The semicircular notch 92*b* is structured for engaging the cross bar 92*a*, as illustrated in FIGS. 8A and 8B. When the notch 92*b* is engaging the cross bar 92*a*, the instrument stand 18*c* is rigidly fixed in the deployed state. Upon a lifting of the cross member 65 (by applying the force F2), the instrument stand 18*c* may be placed in the collapsed state. It may be noted that the structure illustrated in FIGS. 8A and 8B, including the cross bar 92*a* and the notch 92*b*, may be provided in a number of equivalent structures. For example, as understood by skilled persons, one or more dados may be provided and arranged for the first end 40*a* of each elongated side member 40-1 may fit into for being maintained in the deployed state. Yet other structures and alternate arrangements are possible.

Yet a further feature that may be included with embodiments of the present invention is providable for aiding in preventing an accidental knocking over of an instrument placed upon the collapsible instrument stand 18. For example, the parallel elongated members 64 or 64*a* may be configured with at least one, and preferably a plurality bumper holes 94 (See FIGS. 2A and 6B). The bumper holes 94 are preferably spaced along an upper surface of parallel elongated members such as 64, 64*a*, and 64*c*. This enables the present invention to be adjusted to accommodate instruments of differing thicknesses. As such, each included bumper hole 94, may be arranged to accept an adjustable body bottom bumper 96. As best seen in FIGS. 6A and 6B, the bottom bumpers 96 may be supported upon a bottom bumper rod 96*a*. In a possibly most preferred embodiment of the bottom bumper rod 96*a*, a threaded rod may be employed that is arranged to mate with hole 94, which may also be threaded.

A plurality of the bottom bumpers 96, each fixed to the top of a rod 96*a*, may be included for a number of reasons. First, properly located bottom bumpers 96 will further aid in preventing an instrument placed upon the collapsible instrument stands 18, 18*a*, etc., from being inadvertently knocked over. In addition, as clearly illustrated in FIG. 7, the inclusion of bottom bumpers 96, along with a case engaging head bumper 75*d*, would enable the instrument stand to be collapsed, adjusted, and clamped to instrument case 100. That is, once collapsed, a preferable embodiment such as stand 18*a*, 18*b*, and or 18*c* may be clamped onto (i.e., piggy backed upon) the instrument case 100 by adjusting the height of the adjustable head 74, and then tightening locking knobs such as 73 and 75*a*. Importantly, structures such as the body bottom bumpers 96, the bottom head bumper 75*d*, etc., may be included with any of the possible embodiments of the invention.

Yet another possible feature of the present invention is depicted in FIG. 7. As shown, if the base is formed of an appropriate and preferably substantially rectangular open frame structure, say having four or more outer support locations (e.g., corners), a plurality of outer support locations may be fitted with a rolling caster 22. As appreciated by skilled persons, the inclusion of such casters or equivalent means, would enable other items to be placed upon and possibly secured to the carry case for easy rolling therewith. Further, the casters may be used to roll the collapsible instrument stand when in the deployed state, and an instrument placed upon or clamped to the instrument stand. A most preferable caster 22 may further include a locking mechanism, such as a locking lever or tab (not illustrated, but well known in the art).

It may be further noted that the embodiments of the instrument stand 18 of the invention may be constructed using any suitable materials. For example, it is contemplated that materials such as wood, metal, plastic, fiberglass, and or a large variety of compositions may be employed for constructing the invention.

Returning to the generalized block diagram of the collapsible instrument stand 18 of FIG. 1, there is provided therein what is intended to be a broadly depicted generalized and generic embodiment. As such, a base member 20 may be termed a 'base means', the first support portion 40 may be termed a first support means, the second support portion 60 may be termed a second support means, and the adjustable neck support 70, may be termed an 'adjustable neck support means'. Importantly, these items may be structured as shown in the figures of this disclosure, or alternately in numerous equivalent versions.

Accordingly, while there have been described herein a plurality of the currently preferred embodiments of the present invention, those skilled in the art will recognize that other and further modifications may be made without departing from the invention. Therefore, when considering the differing instrument stand embodiments 18*a*, 18*b*, and 18*c*, it must be understood that these are examples provided to fully define the invention. Other derivations are certainly providable by skilled individuals that have carefully reviewed the teachings of the present disclosure.

In addition, a number of additional minor structures may be provided that enhance the practical use of the present invention. For example, a skilled person would appreciate the usefulness of adding a cushioning material to certain 'instrument contacting' portions. One possible arrangement and use of cushioning materials 98 is depicted in FIGS. 6A, 6C and 6D. The inclusion of cushioning materials 98 upon certain support portions or surfaces of the collapsible instrument stand 18, such as upon an inner arcuate surface of concave recess 76*a*, or the instrument contacting surfaces of the first support portion 40 and the second support portion 60, will certainly help to protect the finely finished surfaces of many quality instruments.

As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A foldable and collapsible instrument stand structured to fold substantially flat when not in use holding and supporting an instrument, the foldable and collapsible instrument stand comprising:

a) a base arranged for placing upon a support surface, with the base structure having a front and a back, and a non-triangular foot print;

b) a first support portion, pivotally coupled to the base proximate to the front of the base, and movable about the pivotal coupling for placing the first support portion in either one of:

i) a folded position wherein the first support portion is substantially parallel to, and proximate to, a plane of the base; and ii) a substantially upright position wherein when an instrument is placed upon the stand a back deck of the instrument is supported by the first support portion;

c) a second support portion, structured with a plurality of spaced and substantially parallel elongated members, with the second support portion pivotally coupled to the first support portion, such that the second support portion, including the parallel elongated members, is movable between:

i) a folded position wherein the second support portion is parallel to, and proximate to, the first support portion; and ii) an extended position, wherein the extended position of the second support portion is arranged for supporting a bottom portion or surface of an instrument placed in the stand; and d) a compound adjustable neck support structure with:

i) an elongated support post slidably coupled to a second end of the first support portion such that the elongated support post is movable to any position between a fully retracted position and a fully extended position; and ii) an adjustable head that is slidably coupled to an upper end of the elongated support post and slidably movable substantially orthogonally to a longitudinal axis oldie elongated support post for placing in any position between a first retracted position and a second extended position;

e) with the collapsible instrument stand arranged to be placed in either one of i) a collapsed state wherein the base, the first support portion and the second support portion fold flat with each closely spaced and substantially parallel; and ii) a deployed state, wherein the first support portion is in the substantially upright position, the second support portion is in the extended position and the instrument stand is able to hold the instrument and provide support simultaneously to each of the bottom portion, the back deck surface, and the neck of the instrument upon an adjusting, as required, of the adjustable neck support of the instrument stand.

2. The foldable and collapsible instrument stand in accordance with claim 1, wherein the head structure includes a concave recess formed to accept and support the neck of the instrument when placed in the instrument stand.

3. The foldable and collapsible instrument stand in accordance with claim 1, wherein the collapsible instrument stand is structured with the second support portion pivotally coupled to the first support portion such that as the first support portion is moved from the folded position to the substantially upright position, the second support portion simultaneously moves from the folded position to the extended position.

4. The foldable and collapsible instrument stand in accordance with claim 1, wherein the second support portion is structured having:

a) two spaced and parallel elongated members;

b) a cross member having a first end and a second end, with a first parallel elongated member fixed to the first end, while the second parallel elongated member is fixed to the second end, thereby establishing the spaced and parallel relationship between the included parallel elongated members; and c) at least one linearly compressible elongated member, wherein a first end of each linearly compressible elongated member is pivotally coupled to the first end of the base, while a second end of each linearly compressible elongated member is rigidly coupled to the cross member such that the linearly compressible elongated member is oriented and maintained substantially parallel to each of the spaced parallel elongated members of the second support portion.

5. The foldable and collapsible instrument stand in accordance with claim 4, wherein the linearly compressible elongated member is provided by a spring loaded linear damping means that will assist an individual in setting up the collapsible instrument stand when changing from the collapsed state to the deployed state.

* * * * *